US011902789B2

(12) United States Patent
Nambisan et al.

(10) Patent No.: US 11,902,789 B2
(45) Date of Patent: Feb. 13, 2024

(54) CLOUD CONTROLLED SECURE BLUETOOTH PAIRING FOR NETWORK DEVICE MANAGEMENT

(71) Applicant: HEWLETT PACKARD ENTERPRISE DEVELOPMENT LP, Houston, TX (US)

(72) Inventors: Gopakumar Nambisan, Bangalore (IN); Vigneshwara Upadhyaya, Bangalore (IN); Carlos Gomez Gallego, Brisbane (AU); Daniel Harkins, Santa Clara, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 733 days.

(21) Appl. No.: 16/532,229

(22) Filed: Aug. 5, 2019

(65) Prior Publication Data

US 2021/0044965 A1  Feb. 11, 2021

(51) Int. Cl.
*H04W 12/50* (2021.01)
*H04L 9/32* (2006.01)
*H04W 76/11* (2018.01)
*H04W 4/80* (2018.01)
*H04L 9/08* (2006.01)
*H04W 12/033* (2021.01)
*H04W 12/0471* (2021.01)

(52) U.S. Cl.
CPC .......... *H04W 12/50* (2021.01); *H04L 9/0841* (2013.01); *H04L 9/3213* (2013.01); *H04W 4/80* (2018.02); *H04W 12/033* (2021.01); *H04W 12/0471* (2021.01); *H04W 76/11* (2018.02)

(58) Field of Classification Search
CPC .............. H04W 12/50; H04W 12/033; H04W 12/0471; H04W 76/11; H04W 4/80; H04W 12/63; H04W 84/18; H04L 9/3213; H04L 9/0841; H04L 2209/80; H04L 9/0894; H04L 9/3271
See application file for complete search history.

(56) References Cited

U.S. PATENT DOCUMENTS 8,588,698 B2   11/2013   Brisebois et al.
9,048,923 B2    6/2015   Molettiere et al.
(Continued)

OTHER PUBLICATIONS

Bluetooth Low Energy (BLE), (Web Page), Retrieved Feb. 23, 2019, 5 Pgs., Cisco.

*Primary Examiner* — Harunur Rashid
(74) *Attorney, Agent, or Firm* — Sheppard Mullin Richter & Hampton LLP

(57) ABSTRACT

Systems and methods are provided for cloud controlled secure Bluetooth pairing for network device management. A method for a mobile device includes sending a Bluetooth pairing request to a network device that cannot connect to a network, wherein the network device responds to the Bluetooth pairing request by sending a challenge token; responsive to receiving the challenge token from the network device, sending the challenge token to a server, wherein the server responds to the challenge token by sending a response token, wherein the response token comprises a secure Bluetooth pairing key; and responsive to receiving the response token from the server, establishing a secure Bluetooth connection with the network device, comprising pairing with the network device using the secure pairing key.

22 Claims, 5 Drawing Sheets

(56) References Cited

U.S. PATENT DOCUMENTS

| | | |
|---|---|---|
| 9,621,645 B2 | 4/2017 | Smus et al. |
| 10,212,136 B1* | 2/2019 | Gehret .................. H04L 63/083 |
| 2003/0056198 A1* | 3/2003 | Al-Azzawe ............ H04L 67/14 |
| | | 709/224 |
| 2005/0066175 A1* | 3/2005 | Perlman .................. H04L 9/302 |
| | | 713/176 |
| 2008/0091773 A1* | 4/2008 | Hameen-Anttila ... H04L 67/125 |
| | | 709/230 |
| 2012/0087493 A1* | 4/2012 | Chidambaram ...... H04L 9/0841 |
| | | 713/182 |
| 2012/0222103 A1* | 8/2012 | Bliding .............. G07C 9/00309 |
| | | 726/7 |
| 2014/0351908 A1* | 11/2014 | Koeller .................. G06Q 30/02 |
| | | 726/6 |
| 2015/0319149 A1* | 11/2015 | Alshammari ......... H04L 9/0869 |
| | | 713/171 |
| 2016/0007391 A1* | 1/2016 | Yu ......................... H04W 76/11 |
| | | 370/328 |
| 2016/0234678 A1* | 8/2016 | Baum ................... H04W 12/04 |
| 2017/0019935 A1 | 1/2017 | Palin et al. |
| 2017/0142090 A1* | 5/2017 | Mahaffey ............ H04W 12/084 |
| 2017/0171747 A1* | 6/2017 | Britt .................. H04W 12/0431 |
| 2018/0359251 A1* | 12/2018 | Corcoran ................ H04W 4/80 |
| 2019/0028478 A1* | 1/2019 | Love .................. G07C 9/00571 |
| 2019/0272541 A1* | 9/2019 | Koeppel .............. G06Q 20/401 |
| 2019/0333304 A1* | 10/2019 | Flynn .................... H04L 9/0894 |

\* cited by examiner

CLOUD CONTROLLED SECURE BLUETOOTH PAIRING FOR NETWORK DEVICE MANAGEMENT

DESCRIPTION OF RELATED ART

The disclosed technology relates generally to data communication networks, and more particularly some embodiments relate to managing network devices in such networks.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

The figures are not exhaustive and do not limit the present disclosure to the precise form disclosed.

DETAILED DESCRIPTION

Occasionally a headless network device will lose its connection to the network. A headless network device is one that does not have a user interface. Headless network devices may include Wireless Access Points, Wireless Local Area Network Controllers, Internet of Things (IoT) devices, and the like. Without a user interface or a network connection, it can be difficult or impossible to debug headless network devices, and so the only alternatives may be to connect a debugger to the device with a cable, or to reset the device and start from scratch.

Some headless network devices now include a second network interface for management and debugging. For example, some network devices feature a Bluetooth Low Energy (BLE) wireless interface. But these BLE interfaces are intentionally unsecured because they have no user interface on which to enter secure pairing keys. Accordingly, any BLE device can access the headless device. In some environments, this may constitute a significant network security concern.

Another limitation of the current approach is that, to debug such devices, a network engineer must physically approach the device to within BLE range, typically 10 meters or less. This requirement can make debugging expensive in terms of both time and money, especially when a network outage affects multiple locations.

Some embodiments of the disclosed technology allow an onsite person to securely debug a headless network device using a handheld or other mobile device. The mobile device may execute a mobile app that may use a remote server to obtain a secure pairing key, and use the secure pairing key to establish a secure BLE connection with the network device. In some embodiments, an onsite network engineer may then debug the network device locally over the Bluetooth connection without the need for a cable or dedicated debugging device. In some embodiments, when the onsite person is not a network engineer, the mobile device may establish a connection to a remote engineer, using, for example, a WiFi or mobile connection. The network engineer may then debug the network device remotely, without the need for an expensive visit to one or more sites.

Embodiments of the disclosed technology are described as employing BLE connections. However, it should be understood that other types of Bluetooth connections may be used.

Figure 1:
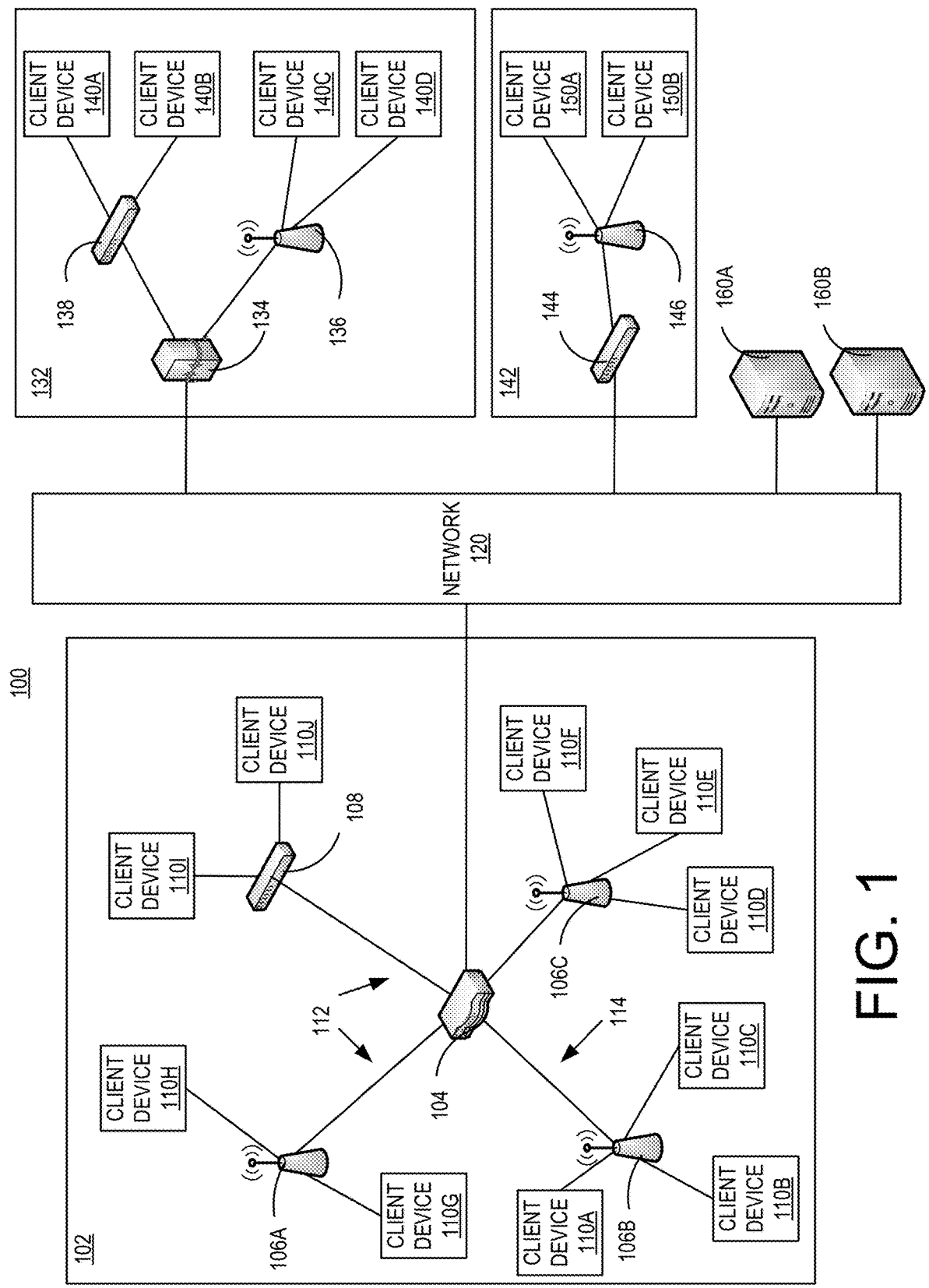
FIG. 1 illustrates one example of a network configuration 100 that may be implemented for an organization.

Before describing embodiments of the disclosed systems and methods in detail, it is useful to describe an example network installation with which these systems and methods might be implemented in various applications. FIG. 1 illustrates one example of a network configuration 100 that may be implemented for an organization, such as a business, educational institution, governmental entity, healthcare facility or other organization. This diagram illustrates an example of a configuration implemented with an organization having multiple users (or at least multiple client devices 110) and possibly multiple physical or geographical sites 102, 132, 142. The network configuration 100 may include a primary site 102 in communication with a network 120. The network configuration 100 may also include one or more remote sites 132, 142, that are in communication with the network 120.

The primary site 102 may include a primary network (not shown), which can be, for example, an office network, home network or other network installation. The primary site 102 network may be a private network, such as a network that may include security and access controls to restrict access to authorized users of the private network. Authorized users may include, for example, employees of a company at primary site 102, residents of a house, customers at a business, and so on.

In the illustrated example, the primary site 102 includes a controller 104 in communication with the network 120. The controller 104 may provide communication with the network 120 for the primary site 102, though it may not be the only point of communication with the network 120 for the primary site 102. A single controller 104 is illustrated, though the primary site may include multiple controllers and/or multiple communication points with network 120. In some embodiments, the controller 104 communicates with the network 120 through a router (not illustrated). In other embodiments, the controller 104 provides router functionality to the devices in the primary site 102.

A controller 104 may be operable to configure and manage network devices, such as at the primary site 102, and may also manage network devices at the remote sites 132, 142. The controller 104 may be operable to configure and/or manage switches, routers, access points, and/or client devices connected to a network. The controller 104 may itself be, or provide the functionality of, an access point.

The controller 104 may be in communication with one or more switches 108 and/or wireless Access Points (APs) 106a-c. Switches 108 and wireless APs 106a-c provide network connectivity to various client devices 110a-j. Using a connection to a switch 108 or AP 106a-c, a client device 110a-j may access network resources, including other devices on the (primary site 102) network and the network 120.

Examples of client devices may include: desktop computers, laptop computers, servers, web servers, authentication servers, authentication-authorization-accounting (AAA) servers, Domain Name System (DNS) servers, Dynamic Host Configuration Protocol (DHCP) servers, Internet Protocol (IP) servers, Virtual Private Network (VPN) servers, network policy servers, mainframes, tablet computers, e-readers, netbook computers, televisions and similar monitors (e.g., smart TVs), content receivers, set-top boxes, personal digital assistants (PDAs), mobile phones, smart phones, smart terminals, dumb terminals, virtual terminals, video game consoles, virtual assistants, Internet of Things (IoT) devices, and the like.

Within the primary site 102, a switch 108 is included as one example of a point of access to the network established in primary site 102 for wired client devices 110$i$-$j$. Client devices 110$i$-$j$ may connect to the switch 108 and through the switch 108, may be able to access other devices within the network configuration 100. The client devices 110$i$-$j$ may also be able to access the network 120, through the switch 108. The client devices 110$i$-$j$ may communicate with the switch 108 over a wired 112 connection. In the illustrated example, the switch 108 communicates with the controller 104 over a wired 112 connection, though this connection may also be wireless.

Wireless APs 106$a$-$c$ are included as another example of a point of access to the network established in primary site 102 for client devices 110$a$-$h$. Each of APs 106$a$-$c$ may be a combination of hardware, software, and/or firmware that is configured to provide wireless network connectivity to wireless client devices 110$a$-$h$. In the illustrated example, APs 106$a$-$c$ can be managed and configured by the controller 104. APs 106$a$-$c$ communicate with the controller 104 and the network over connections 112, which may be either wired or wireless interfaces.

The network configuration 100 may include one or more remote sites 132. A remote site 132 may be located in a different physical or geographical location from the primary site 102. In some cases, the remote site 132 may be in the same geographical location, or possibly the same building, as the primary site 102, but lacks a direct connection to the network located within the primary site 102. Instead, remote site 132 may utilize a connection over a different network, e.g., network 120. A remote site 132 such as the one illustrated in FIG. 1 may be, for example, a satellite office, another floor or suite in a building, and so on. The remote site 132 may include a gateway device 134 for communicating with the network 120. A gateway device 134 may be a router, a digital-to-analog modem, a cable modem, a Digital Subscriber Line (DSL) modem, or some other network device configured to communicate to the network 120. The remote site 132 may also include a switch 138 and/or AP 136 in communication with the gateway device 134 over either wired or wireless connections. The switch 138 and AP 136 provide connectivity to the network for various client devices 140$a$-$d$.

In various embodiments, the remote site 132 may be in direct communication with primary site 102, such that client devices 140$a$-$d$ at the remote site 132 access the network resources at the primary site 102 as if these clients devices 140$a$-$d$ were located at the primary site 102. In such embodiments, the remote site 132 is managed by the controller 104 at the primary site 102, and the controller 104 provides the necessary connectivity, security, and accessibility that enable the remote site 132's communication with the primary site 102. Once connected to the primary site 102, the remote site 132 may function as a part of a private network provided by the primary site 102.

In various embodiments, the network configuration 100 may include one or more smaller remote sites 142, comprising only a gateway device 144 for communicating with the network 120 and a wireless AP 146, by which various client devices 150$a$-$b$ access the network 120. Such a remote site 142 may represent, for example, an individual employee's home or a temporary remote office. The remote site 142 may also be in communication with the primary site 102, such that the client devices 150$a$-$b$ at remote site 142 access network resources at the primary site 102 as if these client devices 150$a$-$b$ were located at the primary site 102. The remote site 142 may be managed by the controller 104 at the primary site 102 to make this transparency possible. Once connected to the primary site 102, the remote site 142 may function as a part of a private network provided by the primary site 102.

The network 120 may be a public or private network, such as the Internet, or other communication network to allow connectivity among the various sites 102, 130 to 142 as well as access to servers 160$a$-$b$. The network 120 may include third-party telecommunication lines, such as phone lines, broadcast coaxial cable, fiber optic cables, satellite communications, cellular communications, and the like. The network 120 may include any number of intermediate network devices, such as switches, routers, gateways, servers, and/or controllers, which are not directly part of the network configuration 100 but that facilitate communication between the various parts of the network configuration 100, and between the network configuration 100 and other network-connected entities. The network 120 may include various content servers 160$a$-$b$. Content servers 160$a$-$b$ may include various providers of multimedia downloadable and/or streaming content, including audio, video, graphical, and/or text content, or any combination thereof. Examples of content servers 160$a$-$b$ include, for example, web servers, streaming radio and video providers, and cable and satellite television providers. The client devices 110$a$-$j$, 140$a$-$d$, 150$a$-$b$ may request and access the multimedia content provided by the content servers 160$a$-$b$.

Figure 2:
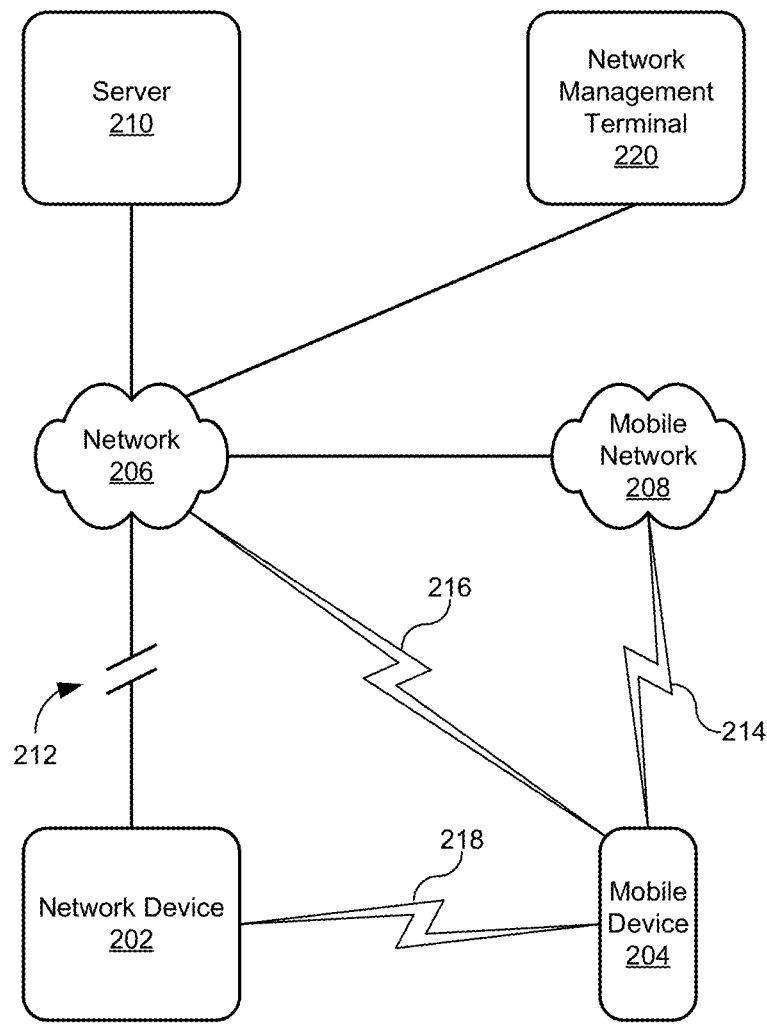
FIG. 2 illustrates a system for cloud controlled secure Bluetooth pairing for network device management according to embodiments of the disclosed technology.

FIG. 2 illustrates a system for cloud controlled secure Bluetooth pairing for network device management according to embodiments of the disclosed technology. Referring to FIG. 2, in this example a network device 202 has lost its connection with a network 206, as illustrated at 212. The network device 202 may be a headless device, that is, a device without a user interface. Without a network connection or user interface, it may be difficult or impossible to debug the network device 202. However, the network device 202 may feature another interface, such as a Bluetooth Low Energy (BLE) interface. To debug the network device 202, and to restore its connection to the network 206, a mobile device 204 establishes a secure connection 218 with the network device 202. For example, mobile device 204 establishes a secure BLE connection 218 with network device 202. In embodiments that employ a connection 214 to the mobile network 208, the mobile device 204 may be implemented, for example, as a smartphone, tablet, laptop, or other similar devices having a network interface 214 to mobile network 208. In embodiments that do not utilize a connection 214 to the mobile network 208, the mobile device 204 may be implemented as a smart phone, tablet, laptop, or other similar devices with or without mobile network interface that is able to connect to network 206 via connection 216.

To establish the secure BLE connection 218, the mobile device 204 may first obtain a challenge token from the network device 202, for example by transmitting a BLE pairing request to the network device 202. The mobile device 204 may pass the challenge token to a server 210 such as via connection 214 or connection 216. To communicate with the server 210, the mobile device 204 may establish a connection 216 to the network 206. For example, the mobile device 204 may establish a Wi-Fi or other network connection to the network 206. Alternatively, the mobile device 204 may establish a connection 214 to a mobile network 208, for example when no connection 216 to the network 206 is available. The mobile network 208 may be a cellular network, or the like. The connection 214 may be a 3G connection, 4G connection, 5G connection, or the like.

In response to receiving the challenge token, the server 210 may provide a response token to mobile device 204. The response token may include a secure BLE pairing key. Responsive to receiving the response token, the mobile device 204 may provide the secure BLE pairing key to the network device 202, thereby pairing itself with network device 202 and establishing the secure BLE connection 218.

Once the secure BLE connection 218 is established, an onsite network engineer may employ the mobile device 204 to debug the network device 202, and reestablish its connection to the network 206. Alternatively, for example when no network engineer is available, a person operating the mobile device 204 may establish a connection between the mobile device 204 and a remote network management terminal 220. A remote network engineer may employ the network management terminal 220 to debug the network device 202 remotely, and reestablish its connection to the network 206.

In some embodiments, several features may be implemented for enhanced security. The secure pairing key may be time-limited, expiring after a predetermined period of time has elapsed. The secure pairing key may be use limited, expiring after a predetermined number of uses such that, for example, each pairing attempt requires a new key. The secure pairing key may, but need not be based on any static secret burned in any of the devices. Instead, ephemeral keys may be used. The secure pairing key may be unique to the person or device generating the key, enabling the system to track network device management access. With ephemeral keys, knowledge of how the keys are generated is insufficient to create the keys, and determining a usable key without legitimate access is computationally difficult. The systems and methods described herein may be configured such that the pairing keys and tokens are invisible to the user of the mobile device 204.

To enhance security, in some embodiments the mobile application has a controlled distribution. For example, network administrators may have control over who can download the application, security requirements for authentication and authorization of users of the application (e.g. password protection), usage logging and tracking, and the like. In some embodiments, the network administrators may also control which types of mobile devices for which specific mobile devices may be used, for example according to the media access control (MAC) addresses of the devices. In some embodiments, the MAC address may be pushed to the mobile app for authentication and authorization. In some embodiments, the network administrators may limit the locations in which the mobile app can function. In some embodiments, the network administrators may limit the users who may use the mobile app.

Figure 3:
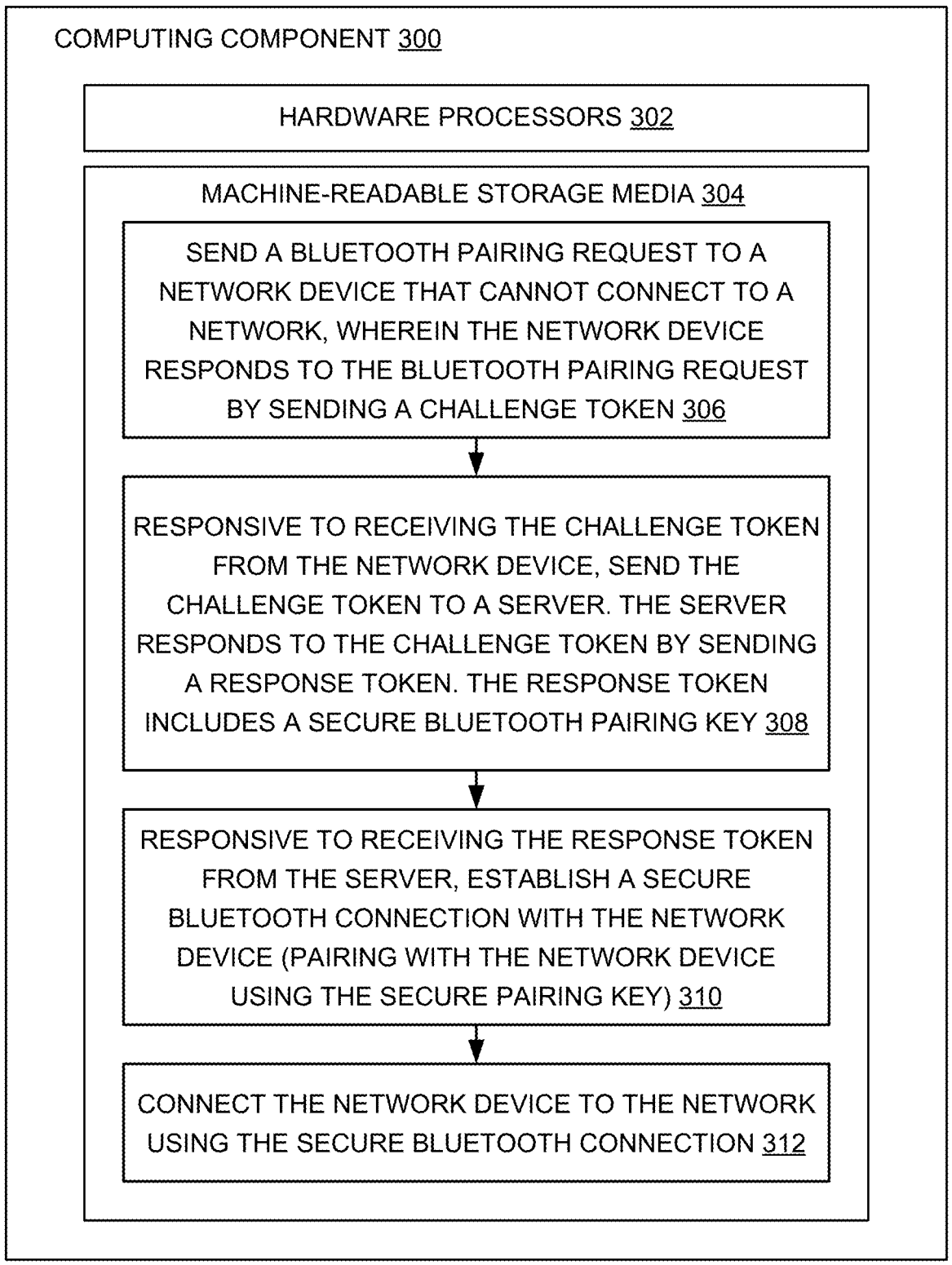
FIG. 3 is a block diagram of an example computing component or device 300 for cloud controlled secure Bluetooth pairing for network device management in accordance with one embodiment.
Figure 4:
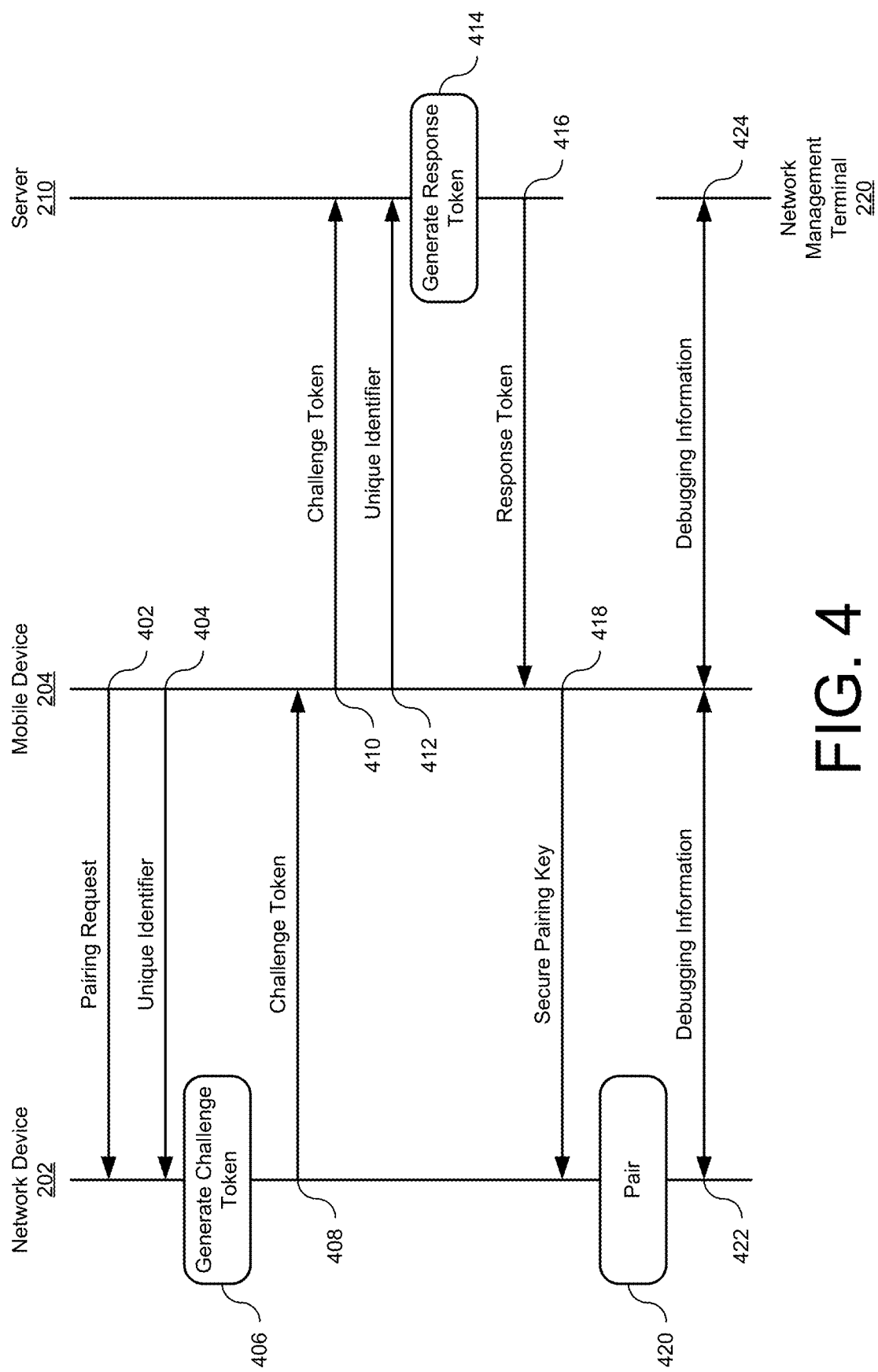
FIG. 4 is a flow diagram illustrating operations and flows for cloud controlled secure Bluetooth pairing for network device management according to embodiments of the disclosed technology.

FIG. 3 is a block diagram of an example computing component or device 300 for cloud controlled secure Bluetooth pairing for network device management in accordance with one embodiment. FIG. 4 is a flow diagram illustrating operations and flows for cloud controlled secure Bluetooth pairing for network device management according to embodiments of the disclosed technology. These flows and operations will be described now with reference to FIGS. 3 and 4.

Referring to FIG. 3, computing component 300 may be, for example, a server computer, a controller, or any other similar computing component capable of processing data. In the example implementation of FIG. 3, the computing component 300 includes a hardware processor 302, and machine-readable storage medium 304. In some embodiments, computing component 300 may be an embodiment of network device 202, mobile device 204, server 210, network management terminal 220, or any combination thereof.

Hardware processor 302 may be one or more central processing units (CPUs), semiconductor-based microprocessors, and/or other hardware devices suitable for retrieval and execution of instructions stored in machine-readable storage medium, 304. Hardware processor 302 may fetch, decode, and execute instructions, such as instructions 306-312, to control processes or operations for cloud controlled secure Bluetooth pairing for network device management. As an alternative or in addition to retrieving and executing instructions, hardware processor 302 may include one or more electronic circuits that include electronic components for performing the functionality of one or more instructions, such as a field programmable gate array (FPGA), application specific integrated circuit (ASIC), or other electronic circuits.

A machine-readable storage medium, such as machine-readable storage medium 304, may be any electronic, magnetic, optical, or other physical storage device that contains or stores executable instructions. Thus, machine-readable storage medium 304 may be, for example, Random Access Memory (RAM), non-volatile RAM (NVRAM), an Electrically Erasable Programmable Read-Only Memory (EEPROM), a storage device, an optical disc, and the like. In some embodiments, machine-readable storage medium 304 may be a non-transitory storage medium, where the term "non-transitory" does not encompass transitory propagating signals. As described in detail below, machine-readable storage medium 304 may be encoded with executable instructions, for example, instructions 306-312. Depending on the implementation, the instructions may include additional, fewer, or alternative instructions, and may be performed in various orders or in parallel.

Hardware processor 302 may execute instruction 306 to send a Bluetooth pairing request to a network device that cannot connect to a network, wherein the network device responds to the Bluetooth pairing request by sending a challenge token. In the example of FIG. 4, the mobile device 204 may transmit a BLE pairing request to the network device 202, at 402. The mobile device 204 may execute an app to perform this and other functions described herein. Responsive to receiving the BLE pairing request, the network device 202 generates the challenge token, at 406, and transmits the challenge token to the mobile device 204, at 408.

In some embodiments, generating the challenge token may include generating an ephemeral key pair. In such embodiments, the challenge token may include an ephemeral public key. In some embodiments, the ephemeral key pair is a Diffie-Hellman ephemeral key pair, and the ephemeral public key is a Diffie-Hellman ephemeral public key.

In some embodiments, the challenge token is generated based on a unique identifier provided by the mobile device 204. In such embodiments, the mobile device 204 transmits the unique identifier to the network device 202, at 404. The unique identifier may be, for example, an email address of an operator of the mobile device 204, a username of the operator, or the like. In some embodiments, the unique identifier may be employed to authenticate the mobile device 204.

Hardware processor 302 may execute instruction 308 to, responsive to receiving the challenge token from the network device, send the challenge token to a server. The server may respond to the challenge token by sending a response token. The response token may include a secure Bluetooth pairing key. In the example of FIG. 4, the mobile device 204 sends the challenge token to the server 210, at 410. In embodiments where the challenge token is generated using the unique identifier, the mobile device 204 sends the unique identifier to the server 210 as well, at 412. In some embodiments, the mobile device 204 may also transmit additional information to the server 210, for example including the location of the mobile device 204, the serial number of the network device 202, and the like. In such embodiments, the additional information may be used for authentication, authorization, and the like.

Responsive to receiving the challenge token, the server 210 may generate a response token, at 414. In embodiments where the challenge token is generated using the unique identifier, the server 210 may generate the response token using the unique identifier as well. In embodiments where the mobile device 204 transmits additional information to the server 210, server 210 may generate the response token using the additional information as well. The server 210 may transmit the response token to the mobile device 204, at 416.

In embodiments where generating the challenge token includes generating an ephemeral key pair, the server 210 may store a static key pair, and may generate the response token using the static key pair. In embodiments where generating the challenge token includes generating Diffie-Hellman ephemeral key pair, the server 210 may store a Diffie-Hellman static key pair, and may generate the response token using the Diffie-Hellman static key pair.

Hardware processor 302 may execute instruction 310 to, responsive to receiving the challenge token from the server, establish a secure Bluetooth connection with the network device. This may include, responsive to receiving the response token from the server, pairing with the network device using the secure pairing key. In the example of FIG. 4, the mobile device 204 pairs with the network device 202 by transmitting the secure pairing key to the network device 202, at 418. Responsive to receiving the secure pairing key, the network device 202 pairs with the mobile device 204, at 420, thereby establishing the BLE connection 218 between the network device 202 and the mobile device 204. At this point, the mobile device 204 may have full management access to the network device 202.

Hardware processor 302 may execute instruction 312 to connect the network device to the network using the secure Bluetooth connection. Referring to FIG. 2, in some embodiments an onsite network engineer employs the mobile device 204 to restore the connection between the network device 202 and network 206. In the example of FIG. 4, this restoration may involve the exchange of debugging information between the network device 202 and the mobile device 204, at 422. For example, consider an access point that is improperly connected to an uplink switch, for example by being connected to the wrong port in the uplink switch. As a result, the access point is assigned an IP address of a different subnet, and consequently is not able to reach cloud servers, network services, and the like. The debugging information reveals this problem, which is then easily corrected, for example by connecting the access point to the correct port in the uplink switch.

In some embodiments, for example where no onsite network engineer is available, the mobile device 204 provides a conduit between the network device 202 and the network management terminal 220 over the BLE connection 218 and either the network connection 216 or the mobile network connection 214. A network engineer may then employ the network management terminal 220 to restore the connection between the network device 202 and the network 206. In the example of FIG. 4, this restoration may involve the exchange of debugging information between the network device 202 and the mobile device 204, at 422, and between the mobile device 204 and the network management terminal 220, at 424.

In some embodiments, the private keys may have tightly controlled access, and are stored only on the sever 210. The public keys may be widely disseminated, for example being loaded on every network device 202. A static-ephemeral Diffie-Hellman key exchange may be performed per NIST SP 800-56A. The server 210 may have a static Diffie-Hellman private/public keypair and the public key may be burned be burned into the operating system of the network device 202. Each network device 202 may generate an ephemeral Diffie-Hellman key pair when prompted by the mobile app.

The challenge token is a hexadecimal string of n bits. A verifiably random elliptic curve may be generated based on a prime field, p, where p is n bits long, using the technique from ANSI X9.62-2005, Appendix A.3.3. A base point G, called a generator, in the elliptic curve based on the prime field p may be generated using the technique from Appendix A.3.4 of ANSI X9.62-2005. To facilitate the reconstruction of a point using "compact representation", the prime may be selected such that p=3 mod 4.

A public/private key pair using the random elliptic curve and generator may be randomly generated. The private key, Spriv, may be securely stored on the server 210, and the public key, Spub, may be copied into the source code for the operating system of the network device 202, where $Spub=G^{Spriv} \mod p$. The process that follows may be used to obtain a key for management access to the network device 202.

The mobile app may send the engineer's registered email ID to the network device 202 in non-secured mode. The network device 202 may generate its own public/private key pair, Cpriv and Cpub according to $Cpub=G^{Cpriv} \mod p$. The public key, Cpub, may be represented solely by the x-coordinate ("compact representation" from section 4.2 of RFC 6090) and may be passed back to the mobile device 204 as an n-bit token. The ephemeral private key, Cpriv, may be used with Spub, which is stored in the operating system, to generate a shared value Z using the public key of the server 210, according to $Z=Spub^{Cpriv} \mod p$.

The x-coordinate of Z is used as a shared secret ss ("compact output" from section 4.2 of RFC 6090). The ephemeral private key Cpriv and Z may then be destroyed and the shared secret retained. The network device 202 may maintain only one shared secret at a time. Any subsequent command to generate a new token before the existing token is used may destroy the old shared secret and thereby invalidate any pairing key obtained using the old token regardless of the token's lifetime.

The mobile application may relay the challenge token obtained from the network device 202 to the server 210. With this challenge token the mobile app may also send the engineer's credentials. The server 210 may treat the token as the x-coordinate of a public key in "compact representation" (from section 4.2 of RFC 6090), may generate a suitable y-coordinate, and may perform a static-ephemeral Diffie-Hellman exchange to generate the shared value Z according to $Z=Cpub^{Spriv}$ mod p. The server 210 may then use the x-coordinate of Z as the shared secret ss ("compact output" from section 4.2 of RFC 6090).

The server 210 may then generate a temporary key, PRK, using the salt-less "extraction" technique from section 2.2 of RFC 5869, with the input keying material being ss, PRK=HKDF-Extract(0, ss). The pairing key, pairingkey, may then be generated using the "expand" technique from section 2.3 of RFC 5869 using PRK with "info" being the engineer"s username and "L" being the length of a pairing key appropriate for use with BTLE.

The server 210 may output the pairing key in the same format as the token. The server 210 may then destroy Z and ss. At this stage the server 210 can also authorize the engineer based on the location, serial number of the network device 202, and the like.

The engineer's mobile device 204 may receive this response token, and use it to pair to the network device 202. The server 210 may record this generation of response token against the engineer name. If access is given, the engineer's username and the time at which access was granted may be logged by the network device 202 also. If access is given, the lifetime of the token shall be checked for expiry. If the token has expired the shared secret ss may be destroyed.

Figure 5:
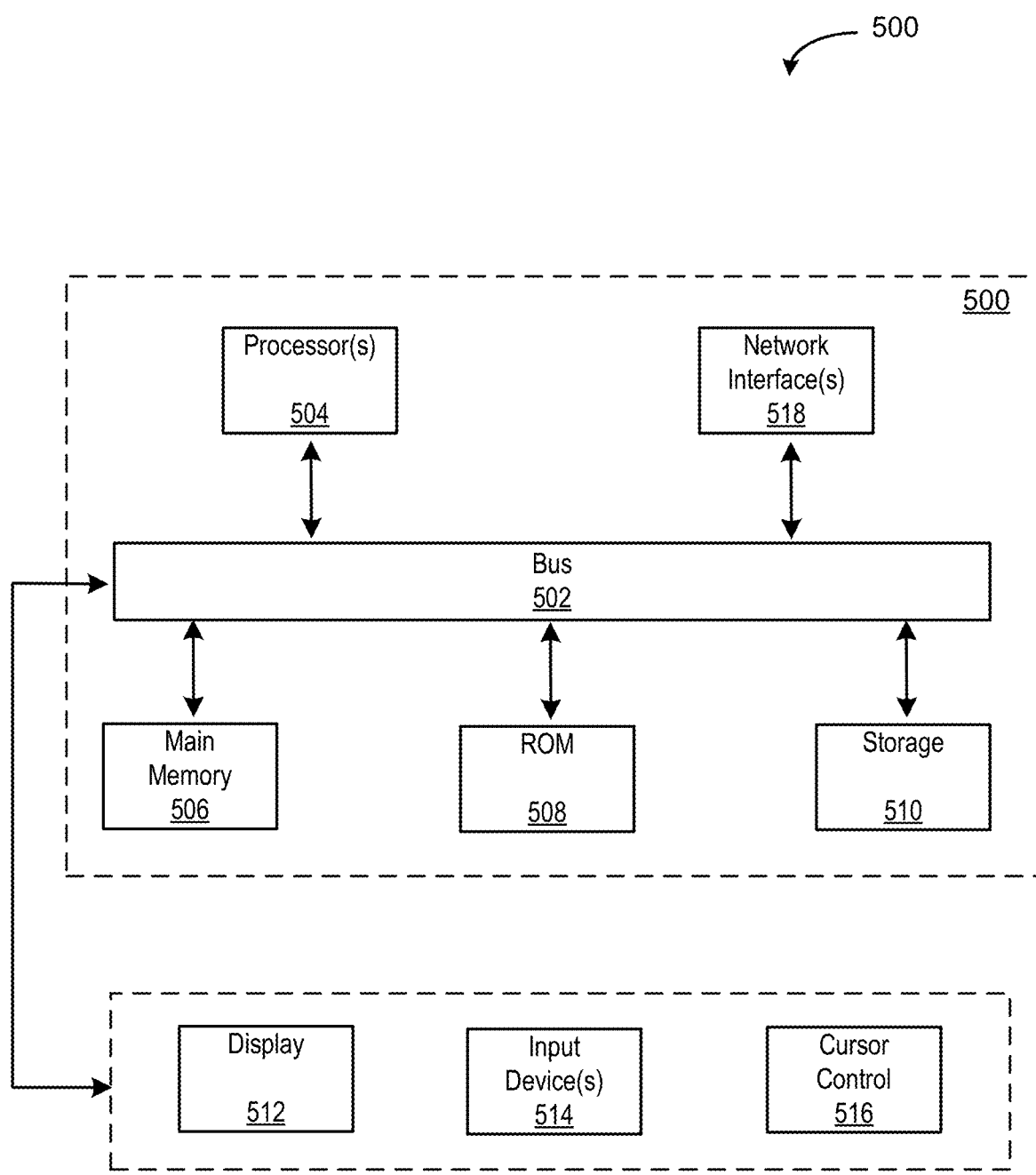
FIG. 5 is an example computing component that may be used to implement various features of embodiments described in the present disclosure.

FIG. 5 depicts a block diagram of an example computer system 500 in which embodiments described herein may be implemented. The computer system 500 includes a bus 502 or other communication mechanism for communicating information, one or more hardware processors 504 coupled with bus 502 for processing information. Hardware processor(s) 504 may be, for example, one or more general purpose microprocessors.

The computer system 500 also includes a main memory 506, such as a random access memory (RAM), cache and/or other dynamic storage devices, coupled to bus 502 for storing information and instructions to be executed by processor 504. Main memory 506 also may be used for storing temporary variables or other intermediate information during execution of instructions to be executed by processor 504. Such instructions, when stored in storage media accessible to processor 504, render computer system 500 into a special-purpose machine that is customized to perform the operations specified in the instructions.

The computer system 500 further includes a read only memory (ROM) 508 or other static storage device coupled to bus 502 for storing static information and instructions for processor 504. A storage device 510, such as a magnetic disk, optical disk, or USB thumb drive (Flash drive), etc., is provided and coupled to bus 502 for storing information and instructions.

The computer system 500 may be coupled via bus 502 to a display 512, such as a liquid crystal display (LCD) (or touch screen), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. In some embodiments, the same direction information and command selections as cursor control may be implemented via receiving touches on a touch screen without a cursor.

The computing system 500 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor(s) 504 executing one or more sequences of one or more instructions contained in main memory 506. Such instructions may be read into main memory 506 from another storage medium, such as storage device 510. Execution of the sequences of instructions contained in main memory 506 causes processor(s) 504 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 510. Volatile media includes dynamic memory, such as main memory 506. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 502. Transmission media can also take the form of acoustic or light waves, such as those generated during radio-wave and infra-red data communications.

The computer system 500 also includes a communication interface 518 coupled to bus 502. Network interface 518 provides a two-way data communication coupling to one or more network links that are connected to one or more local networks. For example, communication interface 518 may be an integrated services digital network (ISDN) card, cable modem, satellite modem, or a modem to provide a data communication connection to a corresponding type of telephone line. As another example, network interface 518 may be a local area network (LAN) card to provide a data communication connection to a compatible LAN (or WAN component to communicated with a WAN). Wireless links may also be implemented. In any such implementation, network interface 518 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 518, which carry the digital data to and from computer system 500, are example forms of transmission media.

The computer system 500 can send messages and receive data, including program code, through the network(s), network link and communication interface 518. In the Internet example, a server might transmit a requested code for an application program through the Internet, the ISP, the local network and the communication interface 518.

The received code may be executed by processor 504 as it is received, and/or stored in storage device 510, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 500.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A system, comprising:
    a hardware processor; and
    a non-transitory machine-readable storage medium encoded with instructions that, when executed by the hardware processor, cause the hardware processor to:
        send a Bluetooth pairing request to a network device that fails to connect to a network, wherein the network device responds to the Bluetooth pairing request by sending a challenge token, responsive to receiving the challenge token from the network device, send the challenge token to a server, wherein the server responds to the challenge token by sending a response token, wherein the response token comprises a secure Bluetooth pairing key, and responsive to receiving the response token from the server, establish a secure Bluetooth connection with the network device, comprising pairing with the network device using the secure pairing key.

2. The system of claim 1, wherein the instructions, when executed by the hardware processor, further cause the hardware processor to:

send a unique identifier to the network device, wherein the challenge token is generated by the network device based on the identifier; and send the unique identifier to the server, wherein the response token is generated by the server based on the identifier.

3. The system of claim 1, wherein the instructions, when executed by the hardware processor, further cause the hardware processor to:

connect the network device to the network using the secure Bluetooth connection.

4. The system of claim 1, wherein the instructions, when executed by the hardware processor, further cause the hardware processor to:

receive debugging data from the network device; and send the debugging data to the server.

5. The system of claim 1, wherein the network device cannot connect to the network, the instructions, when executed by the hardware processor, further cause the hardware processor to:

send the challenge token to a server over a mobile connection; and receive the challenge token from the server over the mobile connection.

6. The system of claim 1, wherein the challenge token comprises an ephemeral public key.

7. The system of claim 6, wherein the ephemeral public key is a Diffie-Hellman ephemeral public key.

8. The system of claim 1, wherein receiving the challenge token comprises receiving, from the network device, a token representing a first public cryptographic key of a first cryptographic key pair generated by the network device in response to the Bluetooth pairing request, and the first cryptographic key pair comprises a first private cryptographic key corresponding to the first public cryptographic key.

9. The system of claim 8, wherein:

the network device generates a shared secret based on a second public cryptographic key of a second cryptographic key pair and the first private cryptographic key;

the second cryptographic key pair comprises a second private cryptographic key corresponding to the second public cryptographic key;

the server generates the shared secret based on the second private cryptographic and the token representing the first public cryptographic key; and the server generates the secure pairing key based on the shared secret.

10. A non-transitory machine-readable storage medium encoded with instructions executable by a hardware processor of a computing component, the machine-readable storage medium comprising instructions to cause the hardware processor to perform a method for a mobile device, the method comprising:

sending a Bluetooth pairing request to a network device that cannot connect to a network, wherein the network device responds to the Bluetooth pairing request by sending a challenge token;

responsive to receiving the challenge token from the network device, sending the challenge token to a server, wherein the server responds to the challenge token by sending a response token, wherein the response token comprises a secure Bluetooth pairing key; and responsive to receiving the response token from the server, establishing a secure Bluetooth connection with the network device, comprising pairing with the network device using the secure pairing key.

11. The medium of claim 10, the method further comprising:

sending a unique identifier to the network device, wherein the challenge token is generated by the network device based on the identifier; and sending the unique identifier to the server, wherein the response token is generated by the server based on the identifier.

12. The medium of claim 10, the method further comprising:

connecting the network device to the network using the secure Bluetooth connection.

13. The medium of claim 10, the method further comprising:

receiving debugging data from the network device; and sending the debugging data to the server.

14. The medium of claim 10, wherein the network device cannot connect to the network, the method further comprising:

sending the challenge token to a server over a mobile connection; and receiving the challenge token from the server over the mobile connection.

15. The medium of claim 10, wherein the challenge token comprises an ephemeral public key.

16. The medium of claim 15, wherein the ephemeral public key is a Diffie-Hellman ephemeral public key.

17. A method for a mobile device, the method comprising:

sending a Bluetooth pairing request to a network device that cannot connect to a network, wherein the network device responds to the Bluetooth pairing request by sending a challenge token;

responsive to receiving the challenge token from the network device, sending the challenge token to a server, wherein the server responds to the challenge token by sending a response token, wherein the response token comprises a secure Bluetooth pairing key; and responsive to receiving the response token from the server, establishing a secure Bluetooth connection with the network device, comprising pairing with the network device using the secure pairing key.

18. The method of claim 17, further comprising:

sending a unique identifier to the network device, wherein the challenge token is generated by the network device based on the identifier; and sending the unique identifier to the server, wherein the response token is generated by the server based on the identifier.

19. The method of claim 17, further comprising:

connecting the network device to the network using the secure Bluetooth connection.

20. The method of claim 17, further comprising:

receiving debugging data from the network device; and sending the debugging data to the server.

21. The method of claim 17, wherein the network device cannot connect to the network, further comprising:
- sending the challenge token to a server over a mobile connection; and
- receiving the challenge token from the server over the mobile connection.

22. The method of claim 17, wherein the challenge token comprises an ephemeral public key.

\* \* \* \* \*